Figure 1:
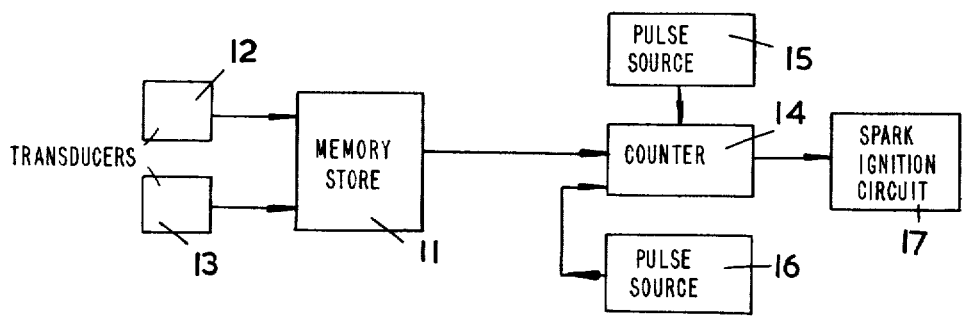

United States Patent [19]

Widdowson et al.

[11] 3,890,516

[45] June 17, 1975

[54] PULSE PRODUCING DEVICES

[75] Inventors: Neville Bruce Widdowson, Redditch; Christopher Varndell Cullingford, Inkberrow, both of England

[73] Assignee: The Lucas Electrical Company Limited, Birmingham, England

[22] Filed: Oct. 11, 1973

[21] Appl. No.: 405,436

[30] Foreign Application Priority Data
Oct. 11, 1972 United Kingdom............ 46774/72
Apr. 11, 1973 United Kingdom............ 17507/73
Apr. 26, 1973 United Kingdom............ 19826/73

[52] U.S. Cl. ............ 310/111; 310/168; 318/135; 318/658; 323/51; 324/34 PS; 340/199; 336/75
[51] Int. Cl. .......................................... H02k 39/00
[58] Field of Search ....... 324/34 PS, 34 D; 340/196, 340/199; 323/51; 318/658, 135, 37; 310/171, 168, 111; 336/75, 79

[56] References Cited

UNITED STATES PATENTS

| 2,484,022 | 10/1949 | Esval | 318/658 X |
| 2,631,272 | 3/1953 | Smith | 340/199 |
| 2,730,664 | 1/1956 | Karlson | 318/658 X |
| 3,030,533 | 4/1962 | Schugt | 310/111 X |

Primary Examiner—Donovan F. Duggan
Attorney, Agent, or Firm—Holman & Stern

[57] ABSTRACT

Pulse producing devices, particularly for use in ignition systems in road vehicles, include a pair of E-shaped cores with windings, and tracks on a movable part which influence flux flow between limbs on the E-shaped cores so that pulses are produced.

3 Claims, 12 Drawing Figures

3,890,516

PULSE PRODUCING DEVICES

This invention relates to pulse producing devices.

In one aspect, the invention resides in a pulse producing device comprising in combination a rotor, an E-shaped core, a first track on said rotor, said track incorporating a plurality of non-magnetic conductive areas spaced from each other and the track being positioned so that said areas modifying the flow of flux between the central limb and one of the outer pairs of limbs of said core in turn as the rotor rotates, a second track on the rotor, the second track being parallel to the first track and also incorporating a plurality of non-magnetic conductive areas spaced from each other and alternating with the conductive areas on the first track, the areas on the second track modifying the flow of flux between the central limb and the other outer limb of said core in turn as the rotor rotates, a first winding on the central limb of the core, and a second winding with two parts wound on the outer limbs of the core, one of said windings being fed in use with an a.c. input signal and an output being taken from the other winding.

In a second aspect, the invention resides in a pulse producing device comprising in combination a rotor, an E-shaped core, a first track on said rotor, said track incorporating a plurality of non-magnetic conductive areas spaced from each other and the track being positioned so that said areas bridge the central limb and one of the outer pair of limbs of said core in turn as the rotor rotates, a second track on the rotor, the second track being parallel to the first track and also incorporating a plurality of non-magnetic conductive areas spaced from each other and alternating with the conductive areas on the first track, the areas on the second track bridging the central limb and the other outer limb of said core in turn so that as the rotor rotates the central limb is bridged with each outer limb alternately, a first winding on the central limb of the core, and a second winding with two parts wound in series opposition on the outer limbs of the core, one of said windings being fed in use with an a.c. input signal and an output being taken from the other winding.

In a third aspect, the invention resides in a pulse producing device comprising in combination an E-shaped core, a rotor having a track incorporating a plurality of non-magnetic conductive areas spaced from each other and arranged so that said areas pass close to the outer ends of the limbs of the E-shaped core, a first winding on the central limb of the core, and a second winding having two parts wound in series opposition on the outer limbs of the core, one of said windings being fed in use with an a.c. input signal and an output being taken from the other winding, the spacing between said areas being such that in one position of the track eddy currents set up in said areas disturb the flux path between the central limb and one outer limb, and in a second angular position eddy currents set up in said areas disturb the flux path between the central limb and the other outer limb so that in these two angular positions there is an unbalanced flow of flux in the two outer limbs thus causing an output in said output winding.

Figure 2:
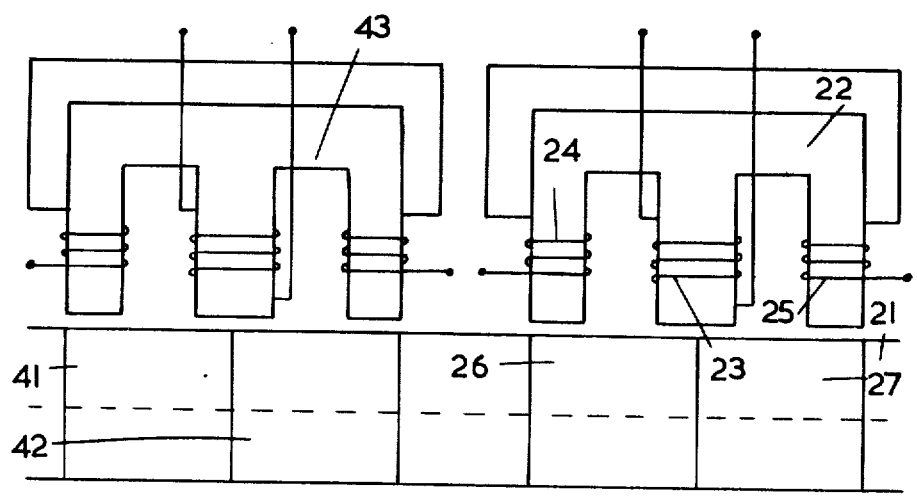
Figure 3:
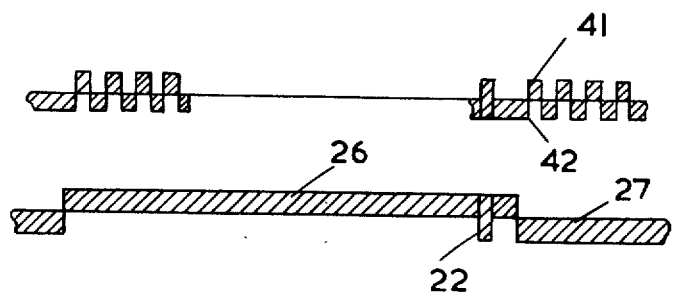
Figure 4:
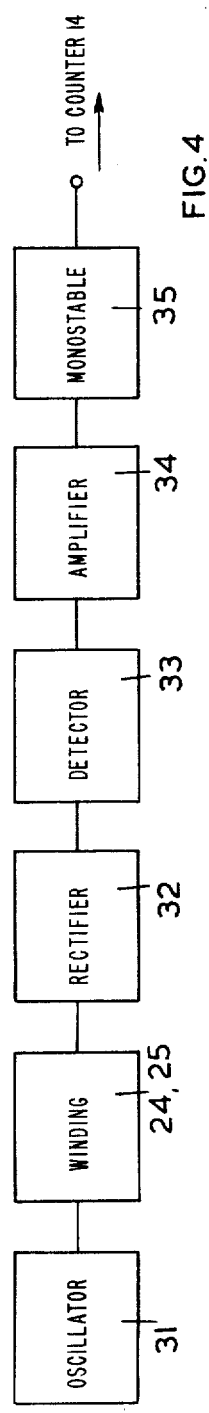
Figure 12:
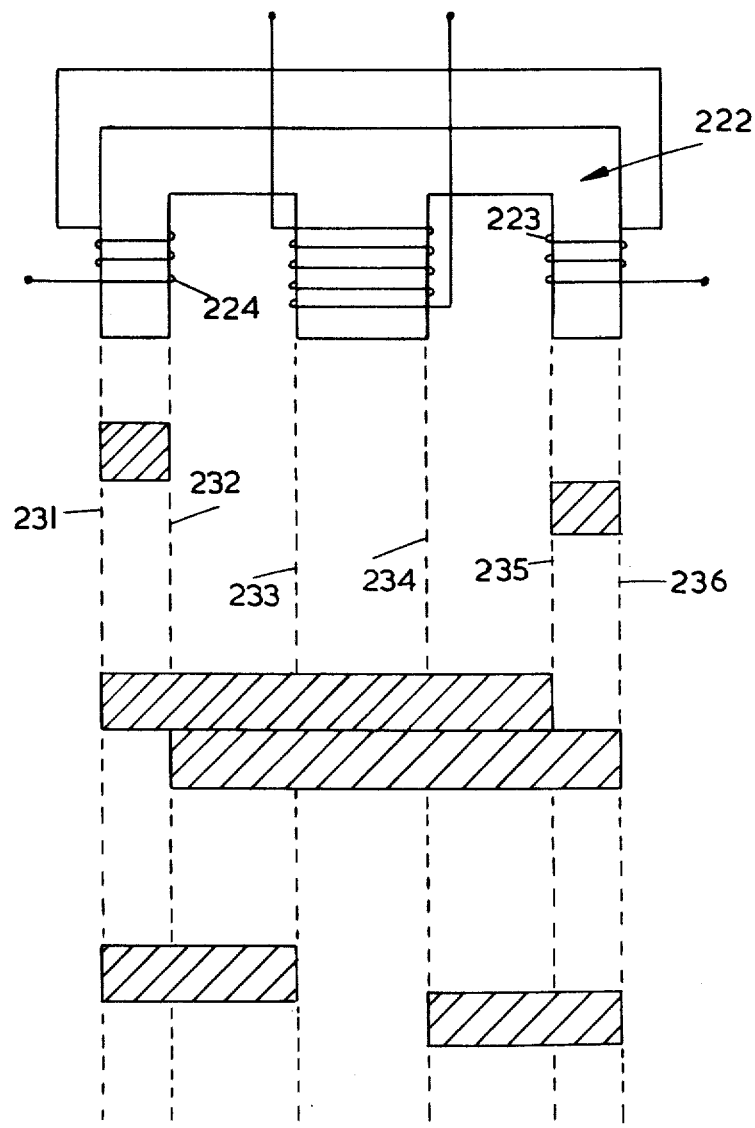

In the accompanying drawings, which illustrates examples of the invention as applied to a spark ignition system for an internal combustion engine:

FIG. 1 is a block diagram of the spark ignition system,

FIG. 2 illustrates diagrammatically a pair of pulse producing devices used in the system, FIG. 3 is a developed view of a cylinder used in FIG. 2 showing portions of the tracks on the cylinder, FIG. 4 is a block diagram of a portion of the system shown in FIG. 1, FIGS. 5 to 7 respectively are wave forms at various points in FIG. 4, FIGS. 8 to 11 respectively are views of a second form of pulse producing arrangement with the track in four different positions, and FIG. 12 illustrates a third form of pulse producing arrangement.

Referring to FIG. 1, there is provided a memory store 11 which receives signals from a pair of transducers 12, 13 associated with the engine. The transducers 12, 13 sense parameters of the engine, and in one example the two parameters are chosen from the group manifold depression, engine speed and throttle angle. The memory store 11 is programmed to produce an output which is dependent upon the values of the input signals it receives from the transducers 12, 13, and represents the required ignition timing for the particular values of the parameters sensed by the transducers 12, 13.

The output from the memory store 11 is fed to a counter 14 which also receives inputs from a pair of pulse sources 15, 16. The pulse source 15 applies a pulse to the counter at a number of predetermined positions of the engine crankshaft, and when the counter 14 receives a pulse from the source 15, it is filled wi.. information from the memory store 11, this information being in the form of a predetermined count which is established within the counter 14. The pulse source 16 produces pulses as the crankshaft rotates, and causes the counter 14 to count down to zero. When the counter 14 reaches zero, it produces an output which operates a conventional spark ignition circuit 17. It will be seen that the larger the count fed to the counter 16 by the memory store 11 when a pulse is received from the pulse source 15, the further the crankshaft must move before sufficient pulses enter the counter 14 from the source 16 to cause the counter 14 to read zero and produce a spark. The pulse source 15 always produces its pulses at predetermined positions of the crankshaft, and the pulse source 16 produces its pulses as the crankshaft rotates, so that the rate of production of the pulses by the source 16 is dependent upon engine speed.

The way in which the pulses are produced is shown in FIGS. 2 to 7. Referring first to FIG. 2, and considering the pulse source 15, the engine drives a drum 21 at a rate proportional to the speed of rotation of the engine crankshaft. Mounted adjacent to said drum is an E-shaped core 22 having a first winding 23 on its central core, and a second winding consisting of two paths 24, 25 wound in series opposition on the outer limbs of the core 22. On the drum 21 are two tracks 26, 27, the track 26 bridging the left-hand limb and the central limb, and the track 27 bridging the right-hand limb and the central limb. In the example shown, two sparks are produced for each revolution of the cylinder 21, and for this purpose the track 26 incorporates a non-magnetic conductive area which is shown in FIG. 3 and subtends an angle of 180°. The track 27 also incorporates a non-magnetic conductive area subtending the other 180°. Thus, for an angular movement of 180°, the left-hand limb and the central limb of the core 22 are bridged by the conductive area on the track 26, and for the next 180° of movement, the central limb and the right-hand limb are bridged by the conductive area on the track 27.

Figure 5:

Turning now to FIG. 4, an oscillator 31 is connected to the winding 23, and the winding 24, 25 provides an output which is fed through a half wave rectifier 32 to a voltage level detector 33, the output from which is fed through an amplifier 34 to a re-triggerable monostable circuit 35 providing an output to the counter 14. As the cylinder 21 rotates, the central limb of the core 22 will be bridged with the outer limbs in turn, and FIG. 5 shows the output from the rectifier 32 as the end of the conductive area on one track and the beginning of the conductive area on the other track approach the core 22. The pulses shown in FIG. 5 are at the frequency of the oscillator 31, but an outer envelope is experienced as a result of the movement of the tracks past the core, the null point occurring at the changeover point from the conductive area on one track to the conductive area on the other track. The output from the half wave rectifier is fed to the level detector, which removes the portion of the waveform entirely to produce a pulse as shown in FIG. 6.

Figure 6:
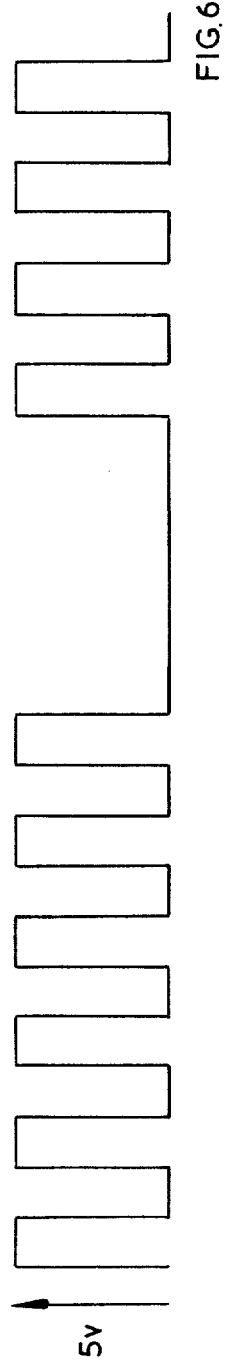
Figure 7:
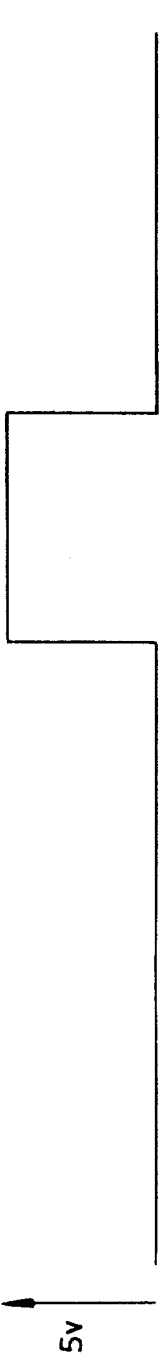

The monostable circuit 35 is triggered by the leading edge of each of the pulses shown in FIG. 6, and has a period slightly in excess of the time between the pulses in FIG. 6. Thus, the monostable circuit normally remains in its unstable condition, but twice in each cycle, during the change when the conductive area on the track 26 to the conductive area on the track 27 and vice versa, an output pulse is obtained from the monostable circuit as shown in FIG. 7. These pulses are used to connect the counter 14 to the store 11 as previously explained.

Considering now the pulse source 16, two further tracks 41, 42 are provided on the cylinder 21, and these tracks co-operate with a further E-shaped core 43 which is similar to the core 22, and has associated therewith a further set of components of exactly the same form as those shown in FIG. 4. Referring to FIG. 3, the track 42 incorporates a plurality of non-magnetic conductive areas spaced from each other, and the track 41 also incorporates a plurality of non-magnetic conductive areas spaced from each other and interposed in the gaps between the conductive areas on the track 42. The conductive areas on the tracks 41 and 42 form a bridge between the central limb of the core 43 and the outer limbs in turn, and so pulses such as the pulse shown in FIG. 7 will be obtained from the equivalent monostable circuit 35 associated with the pulse source 16, but of course at a far greater frequency than the pulses received from the source 15. Considering FIG. 3 again, immediately after the change from the conductive area on the track 26 to the conductive area on the track 27 there is a conductive area on the track 42 followed by a conductive area on the track 41 and so on, and so pulses are received immediately by the counter 14 from the pulse source 16. The maximum number of pulses required to re-set the counter 14 to zero is such that the conductive areas on the tracks 41, 42 need not be continued for a full 180°, because a sector of this length will never be used in practice. When sufficient alternate conductive areas have been provided on the tracks 41, 42, a continuous conductive area is provided on the track 42, and as will be seen in FIG. 3, this continuous area reverts to successive conductive areas on the tracks 42, 41 at the point on the drum where the conductive area on the track 27 terminates and the conductive area on the track 26 starts again. Thus, as the cylinder 21 rotates, the winding 24, 25 on the core 22 produces an output which sets the counter 14 with the information stored in the memory store 11, and then the equivalent winding on the core 43 produces a series of pulses which cause the counter 14 to re-set to zero. When the counter 14 has re-set to zero, pulses are still produced by the pulse source 16, but play no part in the operation. A short while later, the pulses cease, and the output from the core 43 is in an oscillation at the frequency of the oscillator. Later in the cycle, another pulse is received from the winding 25, and the pulses from the source 16 start again.

It will of course be appreciated that although each pair of tracks 42 must be separated by a track 41 and vice versa, nevertheless the tracks 41 and 42 can overlap in a direction at right angles to their direction of movement, that is to say vertically as seen in FIG. 3, or horizontally as seen in FIG. 2.

Referring now to FIGS. 8 to 11, there is provided an E-shaped core 111 having a control limb 112 and outer limbs 113 and 114.

There is also provided a disc-shaped rotor having an endless track 115 on a surface of the disc presented to the E-shaped core, only a linear portion of which is shown in the drawings. The track includes a plurality of non-magnetic conductive areas, five of which are shown at 116 to 120 respectively. The areas 115 to 120 are copper segments moulded in a synthetic resin base material forming the main body of the rotor, the rotor being produced by conventional printed circuit techniques. The copper segments form a planar air gap with the ends of the limbs of the E-shaped core and are arranged such that when the rotor rotates the segments pass across the limbs of the E-shaped core in turn.

There is further provided an a.c. source 122 having a frequency at least ten times the maximum frequency of the pulses produced as hereinafter described by the pulse producing device shown in the drawings, said a.c. source 122 supplying a pair of windings 123 and 124 which are connected in series, but are wound on the limbs 114 and 113 in opposition to one another. A further winding 125 is wound on the limb 112 and connected to a pair of output terminals 126.

Figure 8:
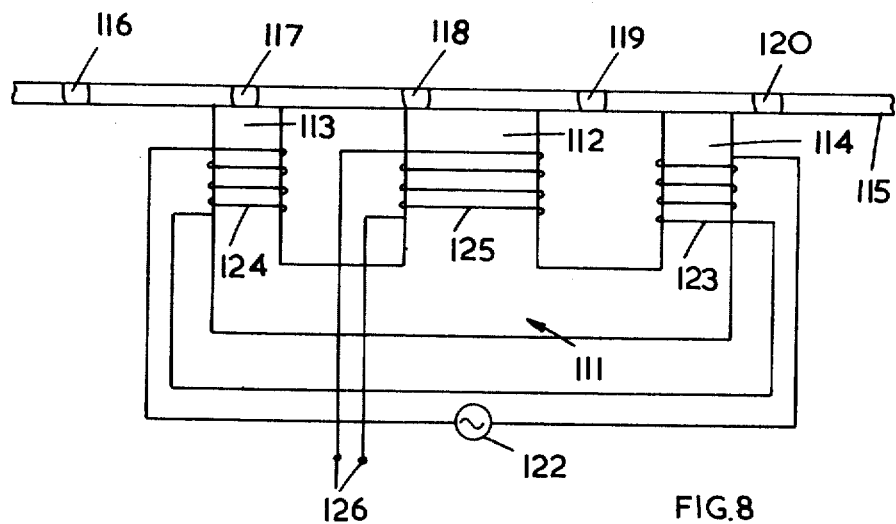

When the track 115 is rotating, and when it is in a positioin such as a position shown in FIG. 8, eddy currents will be set up in the conductive area 117 and these eddy currents will create a field additional to that set up by the winding 124 and the additional field will disturb the flux path between the limb 113 and the central limb 112, thereby inducing a voltage in the winding 125 so that an output is obtained at the terminals 126.

Figure 9:
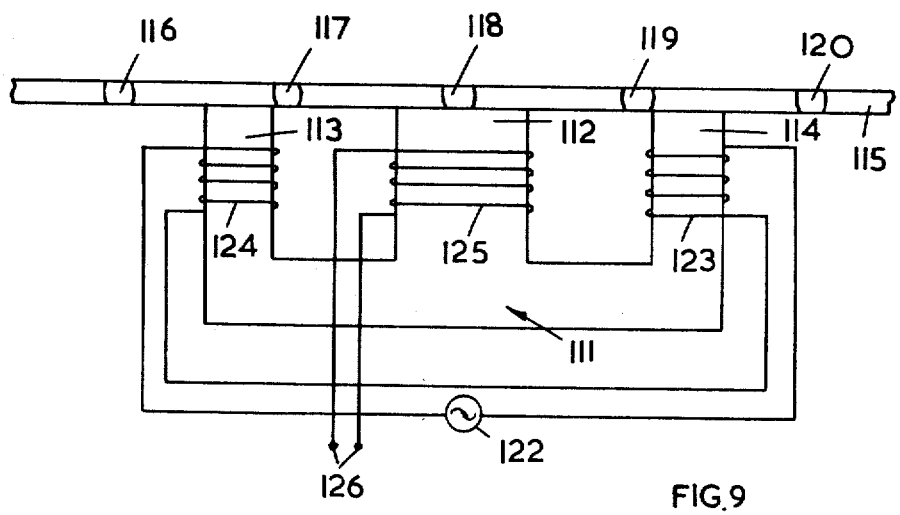

When the track 115 moves a small distance to the position shown in FIG. 9, then any eddy currents set up on the areas 117 and 119 produce additional fields which are balanced so that there is a balanced flow of flux through the limb 112 since the windings 123 and 124 are mounted opposition, and no voltage is induced in the winding 125 so that no output will be obtained at the terminals 126.

Figure 10:
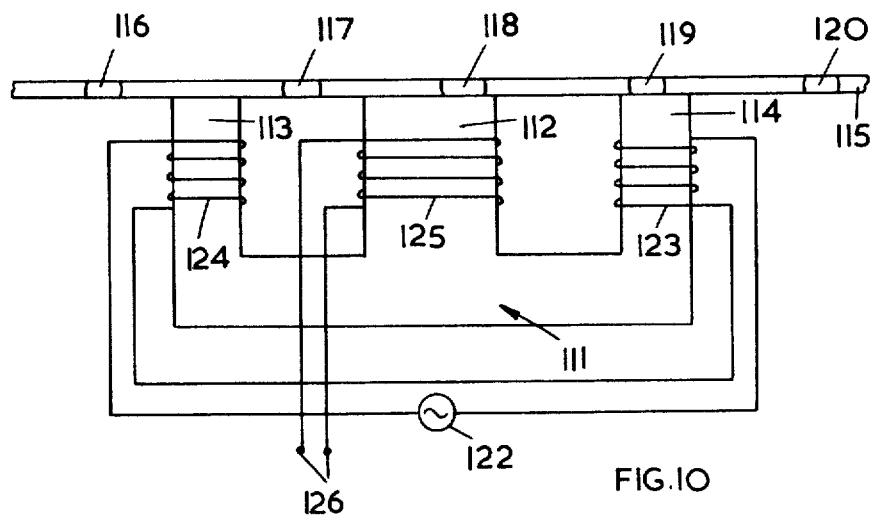
Figure 11:
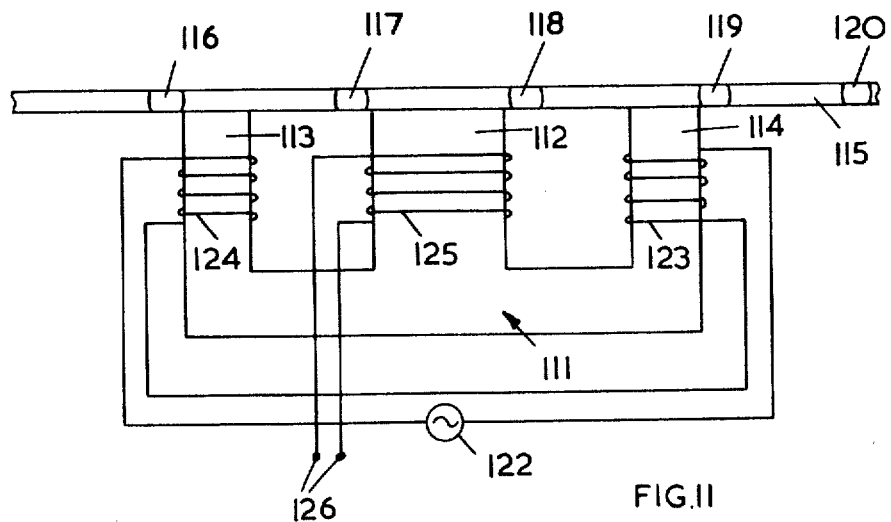

As the track 115 moves further, the position shown in FIG. 10 is attained, in which eddy currents are set up in the conductive area 119 which currents set up an additional field to thereby disturb the field produced by the winding 123 and cause a voltage to be induced in the winding 125 so that an output is once again obtained at the terminal 126.

When the track 115 moves a further small distance to the position shown in FIG. 11, it will once again be seen that a balanced flow of flux is produced in the core 111 so that no output is obtained at the terminals 126. The area 116 then moves to the position occupied in FIG. 8 by the area 117, and a further pulse is obtained. Thus, it will be seen that in every revolution of the track 115, a number of pulses is obtained which is equal to twice the number of conductive areas.

It will be appreciated of course that by measuring the frequency of the output pulses the speed of rotation of the track 115 can be measured. Alternatively, by providing a reference, the number of pulses starting from the reference point can be counted to indicate the angular position of the track 115.

In a modification the conductive areas could be formed in a cylinder where they are circumferentially spaced from each other and in this case the extremeties of the limbs 112, 113, and 114 could be arranged to lie substantially on a common cylinder. The operation of this modification is the same as that described above.

The above described pulse producing device can be used in the spark ignition system for an internal combustion engine shown in FIG. 1.

While in the example shown in FIGS. 8 to 11 the non-magnetic conductive segments have been insulated from each other by embedding them as discrete areas in a non-magnetic substrate, it will be appreciated that the rotor could be made completely from the non-magnetic conductive material with the areas disturbing the flux paths of the E-shaped core, protruding from the planar or cylindrical surface. Obviously the amount by which the areas protrude will affect the performance of the device, since a very shallow recess between the consecutive areas would have little effective disturbance on the flux balance as the rotor rotated and hence would be unsuitable. However, since the rotor can be quite easily produced by conventional printed circuit techniques, this is to be preferred.

Referring now to FIG. 12, a drum is driven as described with reference to FIG. 2 at a rate proportional to the speed of rotation of the engine crankshaft. Mounted adjacent to the drum is an E-shaped core 222 having a first winding 223 on its central core, and a second winding consisting of two paths 224 and 225 wound in series opposition on the outer limbs of the core 222. On the drum are first and second tracks the first track incorporating a plurality of non-magnetic conductive areas spaced from each other, and the second track also incorporating a plurality of non-magnetic conductive areas spaced from each other and interposed in the gaps between the conductive areas on the first track.

The arrangement of the conductive areas on the first and second tracks must be such that the flow of flux between the central limb and the left-hand limb is modified by the first track, and the flow of flux between the central limb and the right-hand limb is modified by the second track. In this way, the device will operate in the manner described with reference to FIG. 2. There are of course numerous possible arrangements of the tracks, and a number of examples are shown. In the drawing, six parallel planes 231 to 236 are indicated, the core 222 lying between the planes 231, 236, with the central limb of the core lying between the planes 233 and 234, and the planes 232, 235 defining with the planes 231 and 236 the limits of the outer limbs of the core. In one example, as shown in FIG. 2, the first track has one part extending between the plane 231 and a central plane intermediate the planes 233, 234, and another part extending between the central plane and the plane 236. Three other possibilities are shown in FIG. 12. In the first, the first track has parts extending between the planes 231 and 232, and the second track has parts extending between the planes 235 and 236. In another example, the first track has parts extending between the planes 231, 235, and the second track has parts extending between the planes 232, 236. In a third possibility, which is the preferred arrangement, the first track has parts extending between the planes 231 and 233, and the second track has parts extending between the planes 234, 236. All the arrangements are of course symmetrical about the central plane, i.e. the plane parallel to and equi-distant from the planes 233, 234.

It will be appreciated that although tracks are shown terminating at the planes 231 and 236, these tracks can be extended outwardly beyond the planes 231 and 236. Such outward extensions have no effect on the normal operation but may be useful in allowing for variations in tolerances in manufacture and use.

Instead of a drum, tracks could be provided on a flexible, endless band drivable around a pair of spaced pulleys so that the tracks move past the core 222 in the required direction.

We claim:

1. A pulse producing device comprising in combination a rotor, an E-shaped core, the outer end surfaces of the limbs of said core being co-planar, a first track on said rotor, said track incorporating a plurality of non-magnetic, conductive areas spaced from each other and the track being positioned so that, as the rotor rotates, said areas in turn pass close to said end surface of one outer limb of said core to modify the flow of flux between the central limb and said one outer limb, a second track on the rotor, the second track being parallel to the first track and also incorporating a plurality of non-magnetic conductive areas spaced from each other and alternating with the conductive areas on the first track, the areas on the second track passing close to said end surface of the other outer limb of said core to modify the flow of flux between the central limb and said other outer limb in turn as the rotor rotates, a first winding on the central limb of the core, and a second winding with two parts wound on the outer limbs of the core, one of said windings being fed in use with an a.c. input signal and an output being taken from the other winding.

2. A pulse producing device comprising in combination a rotor, an E-shaped core, the outer end surfaces of the limbs of said core being co-planar, a first track on said rotor, said track incorporating a plurality of non-magnetic, conductive areas spaced from each other and the track being positioned so that, as the rotor rotates, said areas in turn pass close to said end surfaces of the central limb and one of the outer limbs of said core to bridge the central limb and said one outer limb, a second track on the rotor, the second track being parallel to the first track and also incorporating a plurality of non-magnetic, conductive areas spaced from each other and alternating with the conductive areas on the first track, the areas on the second track in turn passing close to said end surfaces of the central limb and the other outer limb of said core as the rotor rotates so that during rotation of the rotor the central limb is bridged with each outer limb alternately, a first winding on the central limb of the core, and a second winding with two parts wound in series opposition on the outer limbs of the core, one of said windings being fed in use with an a.c. input signal and an output being taken from the other winding.

3. A pulse producing device comprising in combination an E-shaped core, the outer end surfaces of the limbs of said core being co-planar, a rotor having a track incorporating a plurality of non-magnetic conductive areas spaced from each other and arranged so that said areas pass close to, said outer end surfaces of the limbs of the E-shaped core, a first winding on the central limb of the core, and a second winding having two parts wound in series opposition on the outer limbs of the core, one of said windings being fed in use with an a.c. input signal and an output being taken from the other winding, the spacing between said areas being such that in one position of the track eddy currents set up in said areas disturb the flux path between the central limb and one outer limb, and in a second angular position eddy currents set up in said areas disturb the flux path between the central limb and the other outer limb so that in the two angular positions there is an unbalanced flow of flux in the two outer limbs thus causing an output in said other winding.

* * * * *